United States Patent
Onno et al.

(10) Patent No.: US 6,944,349 B1
(45) Date of Patent: Sep. 13, 2005

(54) DEVICE AND METHOD FOR TRANSFORMING DIGITAL SIGNAL

(75) Inventors: Patrice Onno, Maginot (FR); Eric Majani, Rennes (FR); James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/550,319

(22) Filed: Apr. 14, 2000

(30) Foreign Application Priority Data

Apr. 15, 1999 (FR) .......................................... 99 04746

(51) Int. Cl.⁷ ................................................ G06K 9/46
(52) U.S. Cl. ..................................... 382/240; 239/248
(58) Field of Search ................................ 382/240, 239, 382/260, 275, 254, 248, 232, 100; 358/1.5, 463, 1.15; 375/240.11, 240.19; 708/308, 401, 300; 348/398

(56) References Cited

U.S. PATENT DOCUMENTS

| | | | | | |
|---|---|---|---|---|---|
| 5,315,670 | A | * | 5/1994 | Shapiro | 382/232 |
| 5,412,741 | A | * | 5/1995 | Shapiro | 382/232 |
| 5,602,589 | A | * | 2/1997 | Vishwanath et al. | 348/398 |
| 6,154,493 | A | * | 11/2000 | Acharya et al. | 375/240.19 |
| 6,201,897 | B1 | * | 3/2001 | Nixon | 382/248 |
| 6,259,819 | B1 | * | 7/2001 | Andrew et al. | 382/248 |
| 6,332,030 | B1 | * | 12/2001 | Manjunath et al. | 382/100 |
| 6,337,929 | B1 | * | 1/2002 | Kajiwara et al. | 382/239 |
| 6,466,698 | B1 | * | 10/2002 | Creusere | 382/240 |

FOREIGN PATENT DOCUMENTS

| | | | |
|---|---|---|---|
| WO | WO 97/16028 | 5/1997 | H04N/7/30 |
| WO | WO 97 18527 | 5/1997 | G06K/9/42 |

OTHER PUBLICATIONS

"Line Based, Reduced Memory, Wavelet Image Compression", Christos Chrysafis et al., Data Compression Conference, US, IEEE Computer Society Press. Los Angeles, CA, Apr. 1998, pp. 398–407.

* cited by examiner

*Primary Examiner*—Anh Hong Do
(74) *Attorney, Agent, or Firm*—Fitzpatrick, Cella, Harper & Scinto

(57) ABSTRACT

In a digital filtering device adopting wavelet transformation, a memory occupancy level of processed data is decreased. An image is divided into a plurality of first blocks each consisting of W pixels by H pixels. Wavelet transformation is performed on each of the first blocks in order to produce sub-frequency band blocks LL, LH, HL, an HH. Sub-frequency band blocks LL produced from the first blocks are grouped in order to produce second blocks having the same size as the first blocks. Wavelet transformation is performed again on the second blocks.

18 Claims, 7 Drawing Sheets

US 6,944,349 B1

DEVICE AND METHOD FOR TRANSFORMING DIGITAL SIGNAL

BACKGROUND OF THE INVENTION

The present invention relates to a device and method for transforming a digital signal, such as, a digital filtering device and method. More particularly, this invention is concerned with block-based discrete wavelet transformation according to which an image to be coded is divided into a plurality of blocks that are mutually independently subjected to discrete wavelet transformation (filtering).

Numerous digital filtering methods and devices are known. Discrete cosine transform (DCT) and wavelet transformation are well-known.

These filtering devices and methods are, generally, incorporated as one part or facility of a unit for coding or decoding image data so as to compress or decompress the image data. Moreover, lots of memory spaces or buffer spaces that are randomly accessible are often necessary to store data during processing. For example, in a conventional configuration for performing image processing using wavelet transformation, image data to be placed in a predetermined memory is read first, and then a filtering step is carried out. The memory space is so large as to make it difficult to perform filtering within such an apparatus as a camera, a facsimile system, a printer, or a copier.

SUMMARY OF THE INVENTION

An object of the present invention is to provide a digital signal transformation device and method in which a memory occupancy level of processed data can be decreased.

The above object is accomplished by a method described below.

A method for performing discrete wavelet transformation on an image signal comprises:

a first step of dividing the image into a plurality of first blocks each consisting of W pixels by H pixels;

a second step of performing wavelet transformation on each of the first blocks to produce sub-frequency band blocks LL, LH, HL, and HH;

a third step of storing sub-frequency band blocks LL so as to produce second blocks each consisting of sub-frequency band blocks LL and having the same size as the first blocks; and a fourth step of performing wavelet transformation on the second blocks.

The details will be provided in conjunction with an embodiment of the art.

DESCRIPTION OF THE PREFERRED EMBODIMENT

Figure 1:
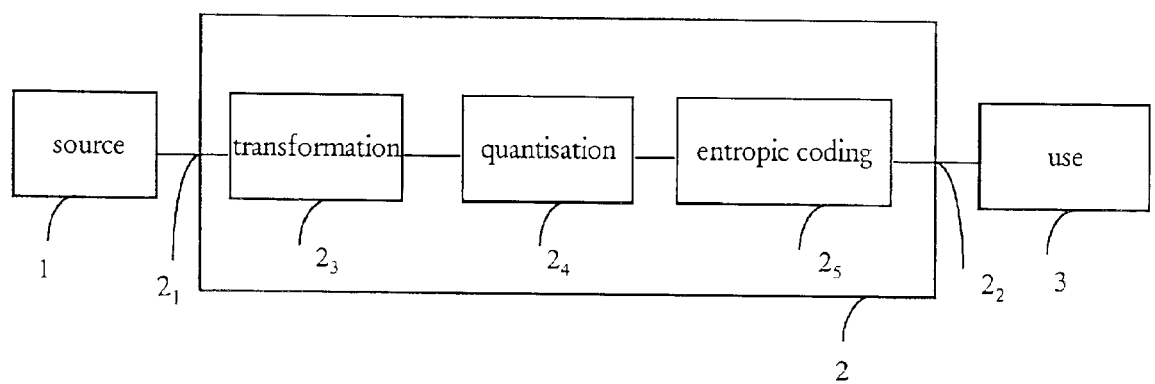
FIG. 1 is a diagram for explaining the role of a digital signal transformation device and method in accordance with the present invention.

FIG. 1 shows an example of a data processing device in accordance with the present invention. A digital signal transformation device and method in accordance with the present invention are concerned with, especially, a transformation circuit $2_3$. In FIG. 1, a data coding circuit 2 is connected to a source 1 of uncoded data and receives an input $2_1$.

The source 1 is a memory means in which uncoded data is stored, for example, a hard disk, a diskette, or a compact disk (CD) that is randomly accessible. The memory means is provided with an appropriate reading means for reading data from the memory means and a recording means for recording data therein.

An encoding process of the source 1 will be detailed below. In an embodiment described below, the block-based discrete wavelet transformation shall be employed.

The source 1 applies an image signal SI to an input terminal of a coding circuit 2. The image signal SI represents a monochrome multi-valued image or a color image. For coding a plurality of color components of a color image or the like, the red, green, and blue color components of a color image or the luminance and chromaticity components thereof are compressed as respective color components.

A user means 3 for handling coded data is connected to an output terminal $2_2$ of the coding circuit 2. The user means 3 includes, for example, a coded data accumulating means and/or a coded data transferring means. The coding circuit 2 includes a conventional transformation circuit $2_3$ that will be described later. The transformation circuit $2_3$ decomposes (filters) an image signal SI into a plurality of sub-frequency band signals so as to analyze the signal. The discrete wavelet transformation is adopted for the decomposition, and the signal is analyzed at least two resolution levels. Incidentally, what is referred to as a signal resolution refers to the number of samples per unit length that is employed in expressing the signal. The transformation circuit $2_3$ is connected to a quantization circuit $2_4$. The quantization circuit quantizes the coefficients of the sub-frequency band signals supplied from the transformation circuit $2_3$ or the groups of coefficients thereof. Specifically, input coefficients are quantized at a predetermined quantization step (for example, a step of scalar quantization or vector quantization), and indices associated with quantized values are output. The output of the quantization circuit $2_4$ is fed to an entropic coding circuit $2_5$. The entropic coding circuit $2_5$ decomposes each of the input quantization indices into bit planes. Huffman coding or arithmetic coding is performed on each bit plane. Consequently, a code stream is output. This kind of coding circuit 2 can be installed in the form of an integrated circuit in a digital apparatus such as a computer, a printer, a facsimile system, a scanner, or a digital camera.

Figure 2:
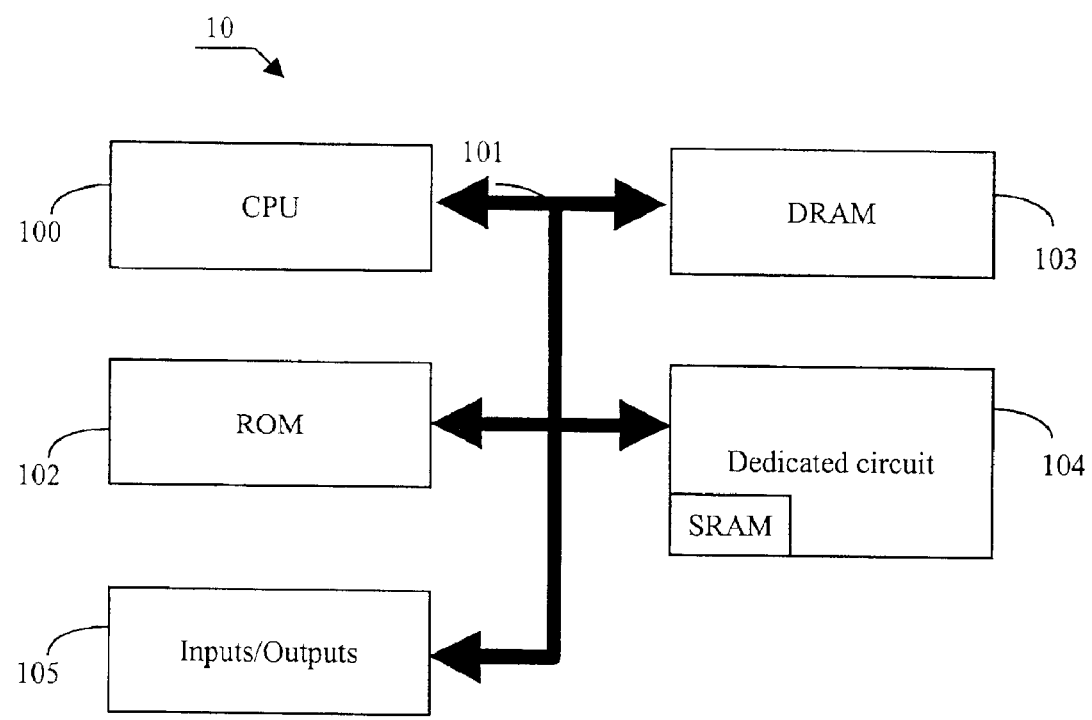
FIG. 2 shows an example of a device in which the digital signal transformation method in accordance with the present invention is implemented.

FIG. 2 shows an example of a configuration to which the data coding circuit 2 shown in FIG. 1 is adapted.

A device 10 is a microcomputer having a communication bus 101 on which a central unit 100, a ROM 102, a RAM 103, a circuit 104 in which the present invention is implemented and which will be described later, and an input/output circuit 105 are connected.

The device 10 includes a keyboard and a disk drive for accepting a diskette, or is designed to be able to communicate with a communication network.

The device 10 receives data to be coded from peripheral equipment including a digital camera via the input/output circuit 105, and transfers coded data to remote equipment over the communication network.

In FIG. 2, the RAM 103 is a so-called DRAM standing for a dynamic random access memory. The memory functions to hold the whole of input or transferred image data. The DRAM is useful in the context of the present invention because image samples can be read in predetermined order.

The circuit 104 is a dedicated circuit for transforming a digital signal in accordance with the present invention. The circuit includes a so-called SRAM standing for a static random access memory. This memory functions as a buffer in which image samples and sub-frequency band signals to be described later are stored temporarily during digital signal transformation. In this embodiment, filtering of image sampled, quantization thereof, and entropy coding thereof are carried out by the circuit 104. The configuration including the dedicated circuit for transforming a digital signal is most suitable for an apparatus including a low-performance CPU such as a printer, a facsimile system, a scanner, or a digital camera.

Figure 3:
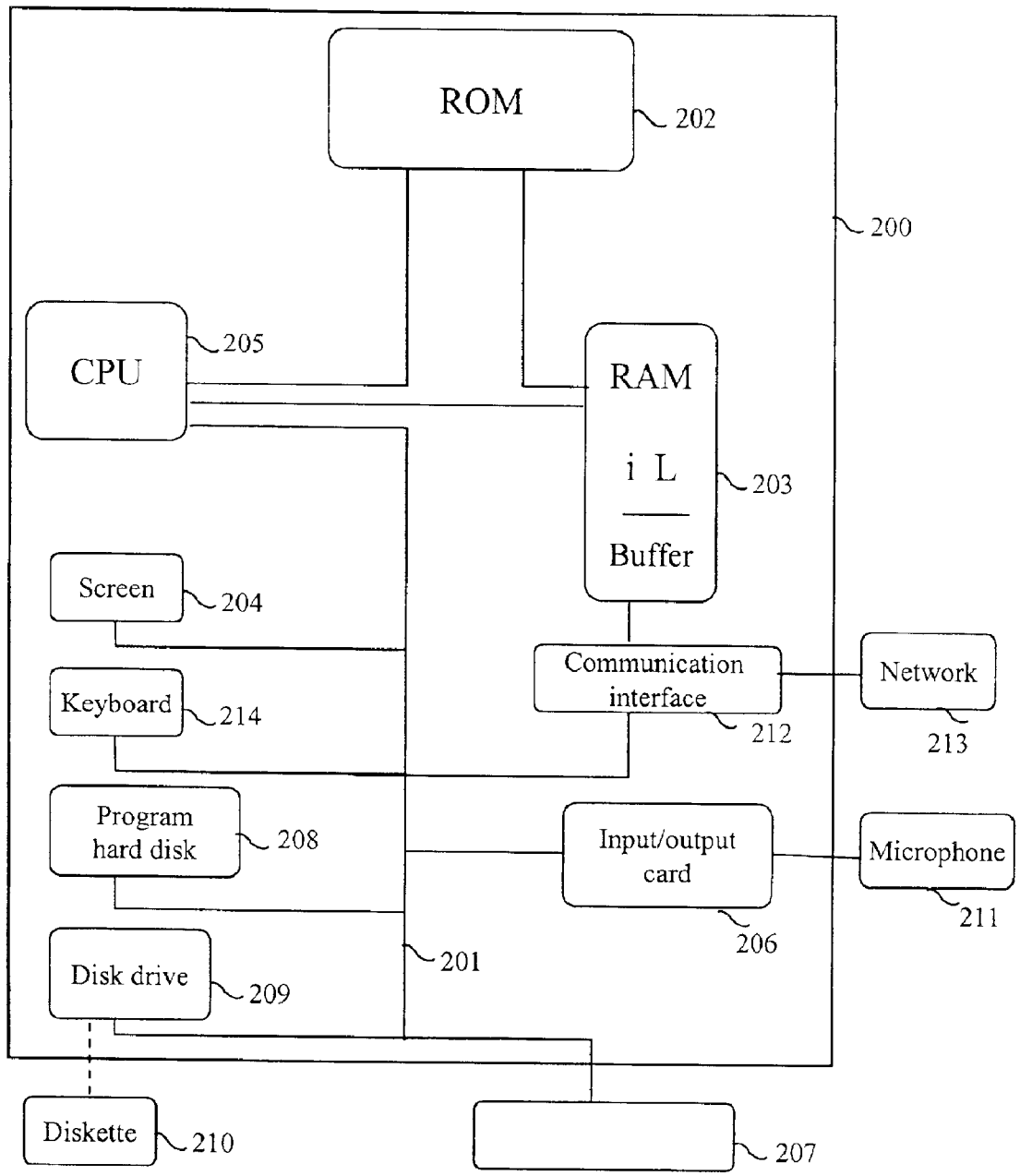
FIG. 3 shows another example of the device in which the digital signal transformation method in accordance with the present invention is implemented.

FIG. 3 shows another example of the configuration to which the data coding circuit 2 shown in FIG. 1 is adapted.

This example introduces a configuration used to perform digital signal transformation in accordance with the present invention within broadly-interpreted signal processing apparatuses including a personal computer or a workstation. In the configuration, digital signal transformation in accordance with the present invention is performed using a CPU that operates based on software instead of using the dedicated circuit shown in FIG. 2.

A device 200 is a microcomputer having a communication bus 201 on which a CPU 205, a ROM 202, a RAM 203, a screen 204, a keyboard 214, a hard disk 208, a disk drive 209, an interface 212, and an input/output card 206 are connected. The disk drive 209 accepts a diskette 210. The interface 212 enables communication with a communication network 213. The input/output card 206 is connected to a microphone 211.

Data coded or to be coded according to the present invention and programs for implementing the present invention to be described later are stored in the hard disk 208. The programs may be read from a magnetic tape, a CD-ROM, or the diskette 210, or may be received over the communication network 213 and stored in the hard disk 208 or RAM 203.

When the device is activated, a program which includes an execution code and is employed in the present invention is transferred to the RAM 203. Variables necessary to implement the present invention are stored in a register in the CPU. The variables to be described later include variables i and L. The RAM also fills the role of a buffer.

The device 200 receives data to be coded from a peripheral apparatus 207 such as a digital camera, a scanner, or any other input or memory means. The data is then stored in the RAM 203. Moreover, the device 200 receives data to be coded from a remote apparatus over the communication network 213. The data is then stored in the RAM 203. Moreover, coded data may be transferred to the remote apparatus over the communication network 213.

The device 200 may receive data to be coded from the microphone 211. The screen 204 may be used in combination with a user interface such as a keyboard. Coded data can be displayed on the screen 204.

The CPU 205 successively codes input or transferred data according to the program. Coded data is stored in the hard disk 208 or transferred to another apparatus over the communication network 213. For coding, refer to FIG. 7.

Figure 4:
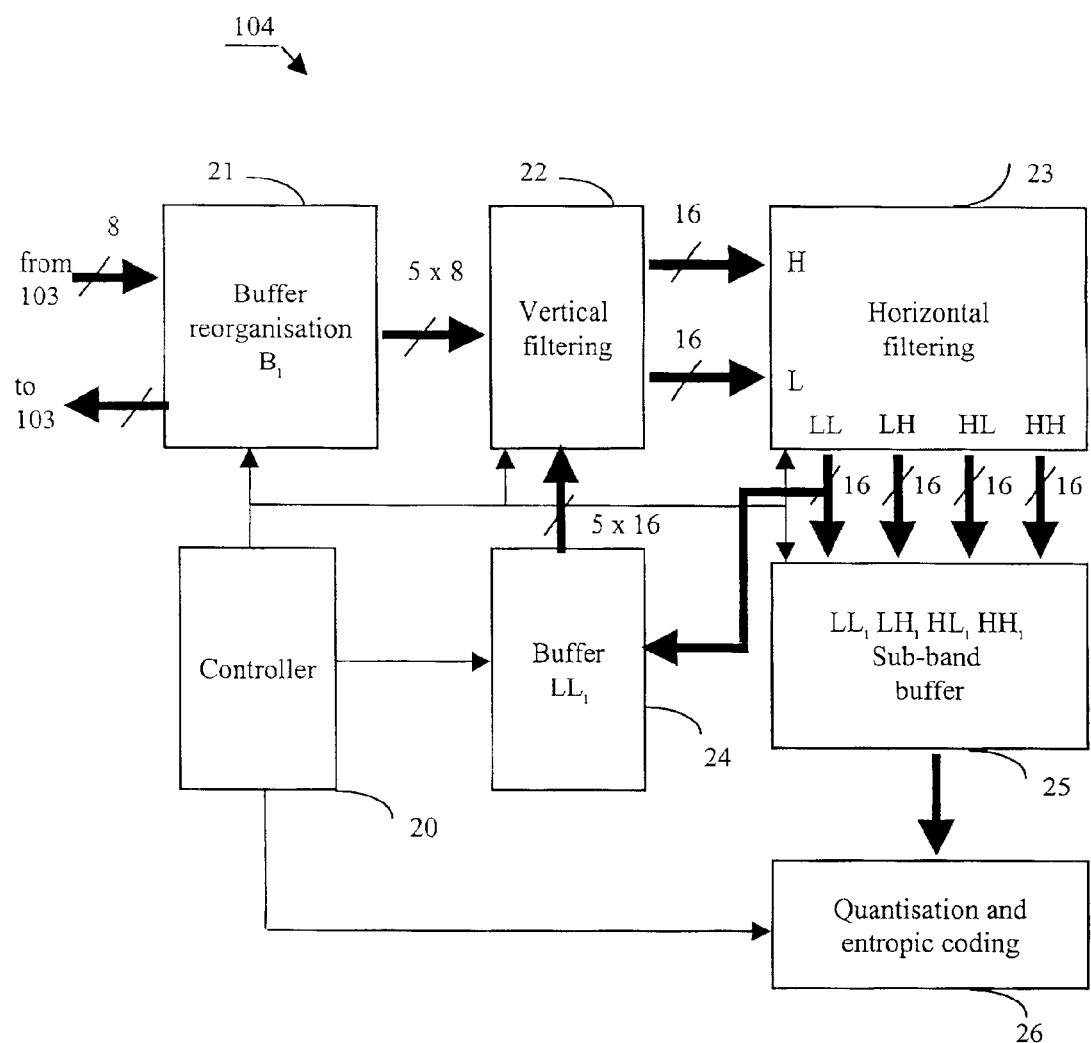
FIG. 4 shows an exemplary configuration of a circuit 104 shown in FIG. 2.

FIG. 4 shows the practical configuration of the circuit 104 shown in FIG. 2.

The circuit 104 includes a controller 20, a reorganization buffer memory module 21, a vertical filtering module 22, a horizontal filtering module 23, a first buffer module 24, a second buffer module 25, and quantization and entropic coding module 26. The controller 20 controls the modules included in the circuit 104.

The module 21 inputs data and outputs data to the RAM 103. Moreover, the module 21 outputs data to the vertical filtering module 22. Furthermore, the module 21 may sort samples so that the samples will be processed in predetermined order, and hold the sorted samples that have not been processed.

The vertical filtering module 22 performs vertical filtering on an image, and outputs the results of filtering to the horizontal filtering module 23.

The horizontal filtering module 23 performs horizontal filtering on an image, and outputs the results of filtering to the modules 24 and 25. The horizontal filtering module may be installed ahead of the vertical filtering module.

Only a sub-frequency band signal whose components have the lowest frequency among four sub-frequency band signals resulting from analysis performed by the horizontal filtering module 23 is stored in the module 24. When an amount of accumulated data becomes equal to a predetermined amount, the data is output to the vertical filtering module 22. The module 25 outputs data to the quantization and entropic coding module 26.

Quantization and entropy coding are conventional techniques and will therefore not be detailed. For the details of quantization, refer to the "Vector Quantization and Signal Compression" by Allen Gersho and Robert M. Gray (Kluwer Academic Publishers). For the details of entropy coding, refer to the "A method for the construction of minimum redundancy codes" by D. A. Huffman (Proceedings of the IRE, 40, pp. 1098–1101, 1952).

The action of the circuit 104 shown in FIG. 2 will be detailed below.

Filtering is performed on each block of samples. One image is logically divided into a plurality of blocks by the controller 20. Talking of one image, as far as a color image is concerned, since the color image is coded in units of one color, one image refers to an image of one color alone. Normally, an input means (digital camera or scanner) decomposes a color image into color components. The circuit 104 is not involved in the decomposition. The blocks are numbered so that they will be processed in numerical order. Each block is shaped like a square, and adjoining blocks overlap by zero or one column of samples and/or one row thereof. All the blocks have the same number of samples (W samples by H samples where W denotes the number of samples vertically lined in an image and H denotes the number of samples horizontally lined therein, or preferably, [W+OW]*[H+OH], where OW denotes the number of columns and OH the number of rows shared by overlapping blocks. In a preferred embodiment the blocks are square, and therefore their size is equal to $[2w+OP]^2$ where $2w=W=H$ and OP denotes the number of columns or rows shared by overlapping blocks). The blocks are all filtered according to the same method (subjected to discrete wavelet transformation). The discrete wavelet transformation to be performed on each block is referred to as the block-based discrete wavelet transformation.

Samples constituting an image to be coded are read block by block from the RAM 103 in which the whole image is stored, and then temporarily stored in an SRAM included in the circuit 104, that is, the module 21. Blocks are read in numerical order of the numbers assigned to the blocks. Each read block is subjected to frequency analysis by the modules 22 and 23. According to the present invention, the analysis is achieved by performing wavelet transformation. Consequently, each block is transformed into four sub-frequency band blocks LL, LH, HL, and HH.

The analysis is carried out at least two resolution levels. Sub-frequency band blocks LL produced at least one resolution level and each composed of low-frequency components lined vertically and horizontally are filtered again by the modules 22 and 23. This loop is carried out at least once. Each block of an initial image is analyzed according to a required resolution level.

The sub-frequency band blocks LH, HL, and HH other than the sub-frequency band block LL which are produced at the first resolution level are fed to the module 25, and quantized and entropy-coded by the module 26 but will not be subjected to frequency analysis at the next resolution level. The module 26 is designed to perform quantization and entropy coding on blocks of a predetermined size equivalent to sub-band blocks produced at the first resolution level.

The modules 22 and 23 work on blocks of a predetermined size (W×H) equivalent to blocks constituting an image, that is, blocks each having a fixed number of samples. A block composed of low-frequency samples resulting from analysis of each block, that is, the sub-frequency band block LL is stored in the buffer 24. The sub-frequency band blocks LL stored are grouped in order to produce blocks of a required size. A group of sub-band blocks is fed to the module 22.

Unless the sub-frequency band blocks LL produced at the last decomposition level are filtered, they need not be stored in the memory 24.

Figure 5:
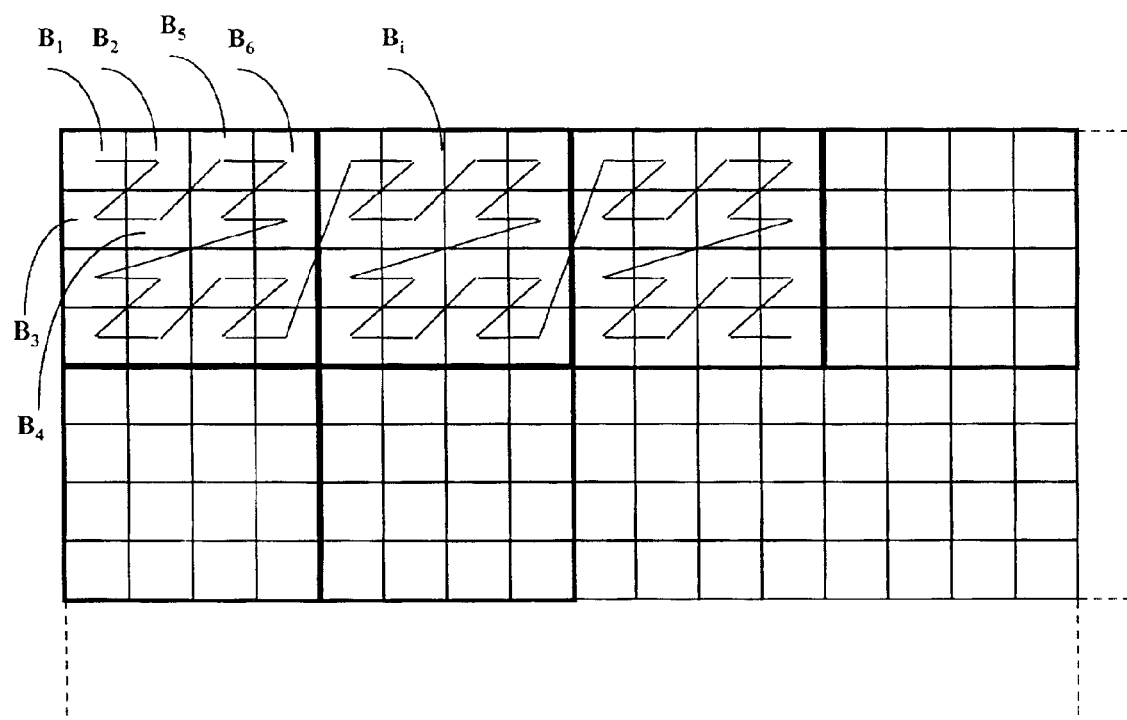
FIG. 5 shows the order of processing blocks in accordance with the first embodiment of the present invention.

FIG. 5 shows an example of part of an image to be coded. Bi (where i denotes an integer indicating the rank of each block) denotes blocks.

In this embodiment, one block is shaped like a square having a size of (64 samples by 64 samples). Noted is that the block size is smaller than an image size. In addition, adjoining blocks overlap by one row of samples and/or one column thereof. For this reason, each block consists actually of (64(+1) samples by 64(+1) samples). The advantage of the overlap between adjoining blocks and edge filtering are detailed in French Patent Application Nos. 99 02303 and 99 02305.

Samples constituting a block are read in predetermined order, for example, zigzag from the left upper corner to the right lower corner. Blocks are read from the RAM 103 in predetermined order as shown in FIG. 5. In FIG. 5, the blocks are read in zigzag. However, the order of reading is not limited to the zigzag order. Any other order of reading will do as long as the memory occupancy ratio of data being processed is minimized, that is, the size of a required memory in the circuit 104 is minimized.

This will be detailed below.

Figure 6:
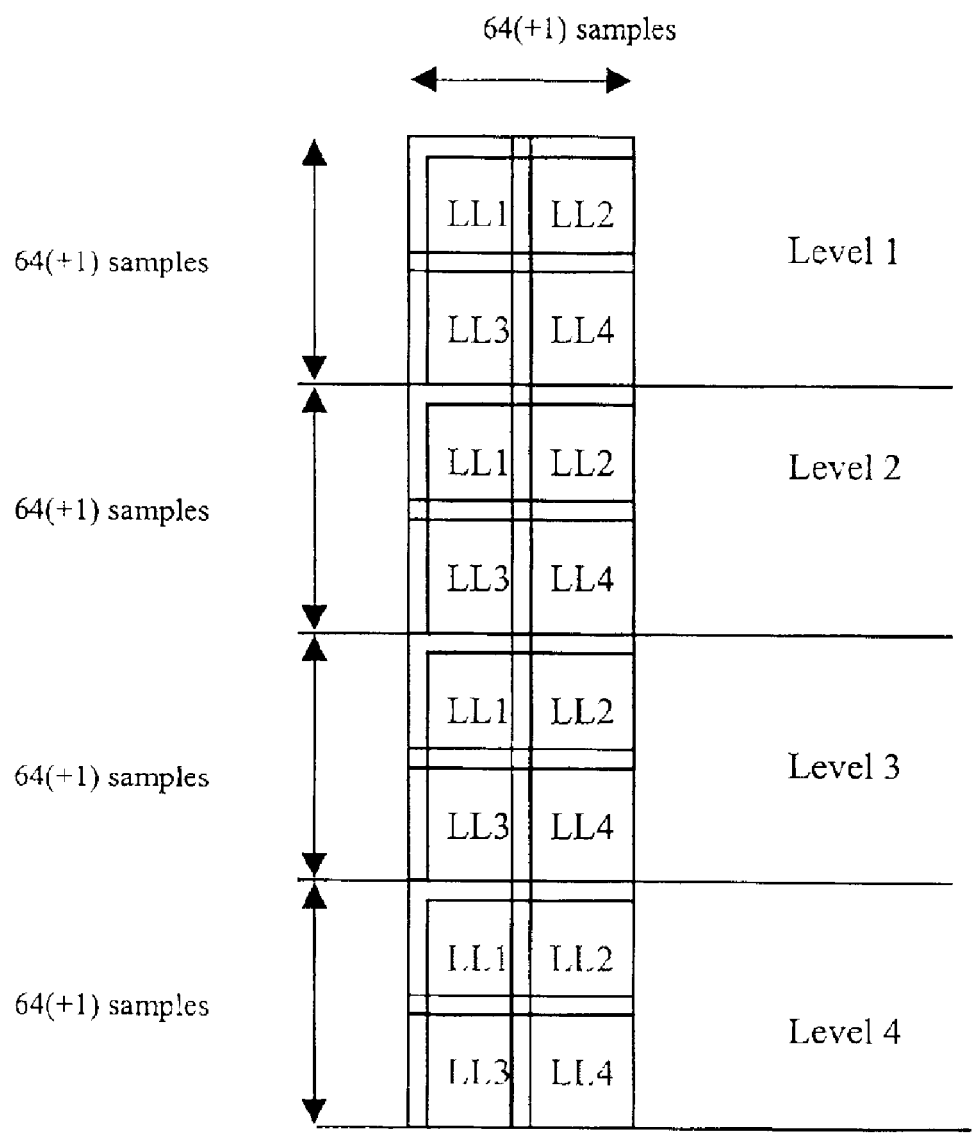
FIG. 6 shows an example of a buffer memory employed in accordance with the present invention.

For grouping and reanalyzing sub-frequency band blocks LL, blocks having the same size as blocks Bi shown in FIG. 6 must be produced. In this case, the positional relationships of the sub-frequency band blocks LL1, LL2, LL3, and LL4 within each block must be consistent with the positional relationships of samples in an image that constitute the sub-frequency band blocks.

For efficiently grouping sub-frequency band blocks as shown in FIG. 6 in consideration of the above positional relationships, blocks to be grouped are handled as a group and blocks belonging to each group are processed successively. In this embodiment, blocks B1, B2, B3, and B4 constitute one group. According to this technique, a memory should have a storage capacity merely permitting storage of the sub-frequency band blocks LL1, LL2, LL3, and LL4 during decomposition to be performed at each resolution level. The required storage capacity of the memory is thus minimized. For example, assume that the blocks B1, B2, B5, B6, B3, and B4 are analyzed in that order. In this case, if the sub-frequency band blocks LL1, LL2, LL3, and LL4 are grouped, an auxiliary memory space is needed in order to bring sub-frequency band blocks LL5 and LL6 produced in the meantime to standby. This means that a larger memory space is needed. However, when the blocks B1, B2, B3 and B4 are analyzed in that order, grouping can be achieved for the shortest time. The grouped blocks can be immediately output to the module 22. This obviates the necessity of the auxiliary memory space.

According to this embodiment, each group composed of four blocks is treated as a sub-band block of a macroblock.

The macroblock is shown as an area encircled with a bold line in FIG. 5. The number of blocks constituting a macroblock varies depending on a required resolution level.

Specifically, a macroblock required at the last i resolution level consists of ($2^{(i-1)}$ vertically lined blocks by $2^{(i-1)}$ horizontally lined blocks).

The group that is regarded as a unit into which sub-frequency band blocks produced at each resolution level are grouped varies hierarchically depending on a resolution level. Specifically, the group consists of (2 blocks by 2 blocks) relative to the second resolution level. As the resolution level rises, the number of blocks included in the group increases. Assuming that the highest resolution level is i, a group to be produced relative to a j(where j<i) resolution level consists of ($2^{(i-1)}$ vertically lined blocks by $2^{(i-1)}$ horizontally lined blocks). Sub-frequency band blocks LL produced at a lower resolution level are grouped in order to produce each group.

An example of the order of processing blocks so as to decompose the blocks at the third resolution level is indicated with a continuous line in FIG. 5. Four blocks constituting a group are all processed before the next group is handled. Likewise, one macroblock is fully processed before the next macroblock is handled. The order of processing four blocks is predetermined but need not be the zigzag order shown in FIG. 5. For example, the blocks B1, B3, B2, and B4 may be processed in that order. What is significant is that all the blocks of a group must be processed before the next group is handled. The same applies to the order of processing the blocks of a group so as to decompose them at any other resolution level.

Through the processing, filtering of one macroblock is achieved at all required resolution levels. That is to say, data of a macroblock being processed is held in a memory and filtered at all the required resolution levels.

As described previously, the number of blocks constituting a macroblock depends on a resolution level. Specifically, one macroblock consists of 16 blocks relative to the third resolution level, 64 blocks relative to the fourth resolution level, and 256 blocks relative to the fifth resolution level.

Now, the circuit 104 will be described again. When a block Bi having a size of (64(+1) samples by 64(+1) samples) is filtered by the modules 22 and 24, four sub-frequency band blocks LLi, LHi, HLi, and HHi are produced. The block Bi is analyzed so that the sub-frequency band block LLi will have a size of (32(+1) samples by 32(+1) samples) and the other blocks LHi, HLi, and HHi will have a size of (32 samples by 32 samples).

The sub-frequency band block LLi consists of low-frequency samples lined in two directions of analysis, that is, the vertical and horizontal directions in an image. The sub-frequency band block LHi consists of high-frequency samples lined in the first direction of analysis and low-frequency samples lined in the other direction of analysis. The sub-frequency band block HLi consists of low-frequency samples lined in the first direction of analysis and high-frequency samples lined in the other direction of analysis. The sub-frequency band block HHi consists of high-frequency samples lined in the two directions of analysis.

The sub-frequency band blocks LLi, LHi, HLi, and HHi resulting from analysis of the current block Bi are input and stored to and in the memory 25. Therefore, the memory 25 has a storage capacity permitting storage of at least 1024(+17) 64-bit words. Thus, one block consisting of (32(+1) 16-bit samples by 32(+1) 16-bit samples) and three blocks each consisting of (32 16-bit samples by 32 16-bit samples) can be stored in the memory 25.

The controller 20 selects one of the four sub-frequency band blocks and transfers the selected one to the module 26. The latter performs quantization and entropy coding on the received data.

As already stated, the memory 24 inputs the sub-frequency band block LLi consisting of low-frequency samples and resulting from decomposition of a block performed by the filtering modules 22 and 23. However, the sub-frequency band block LLi produced at the lowest resolution level is excluded because the data produced at the last resolution level need not be analyzed any more.

FIG. 6 shows the structure of the memory 24. The memory 24 has four areas in which the sub-frequency band blocks LLi produced at the respective resolution levels by the filtering modules 22 and 23 are stored. Herein, the highest resolution level is 4. If the highest resolution level is 3, the number of memory areas may be three.

The sub-frequency band block LLi produced at each resolution level is stored in each area in the memory 24. The memory 24 therefore has a storage capacity permitting storage of (64(+1) samples by 64(+1) samples) into which the four sub-frequency band blocks LLi having the size of (32(+1) 16-bit samples by 32(+1) 16-bit samples) are integrated. Adjoining ones of the four sub-frequency band blocks LLi having the size of (32(+1) samples by 32(+1) samples) overlap by one row of samples and/or one column thereof. Therefore, for example, the $33^{rd}$ row in the left upper block LL1 is aligned with the first row in the right upper block LL2. For this reason, the four sub-frequency band blocks LLi having the size of (32(+1) samples by 32(+1) samples) are grouped into the block having the size of (64(+1) samples by 64(+1) samples). Each block LLi is written in the memory 24 by scanning the memory 24 zigzag.

As soon as a storage area is filled, the data in the storage area is reanalyzed. The data is therefore fed to the vertical filtering module 22.

When all blocks have been analyzed at all resolution levels, a processing sequence is terminated.

Figure 7:
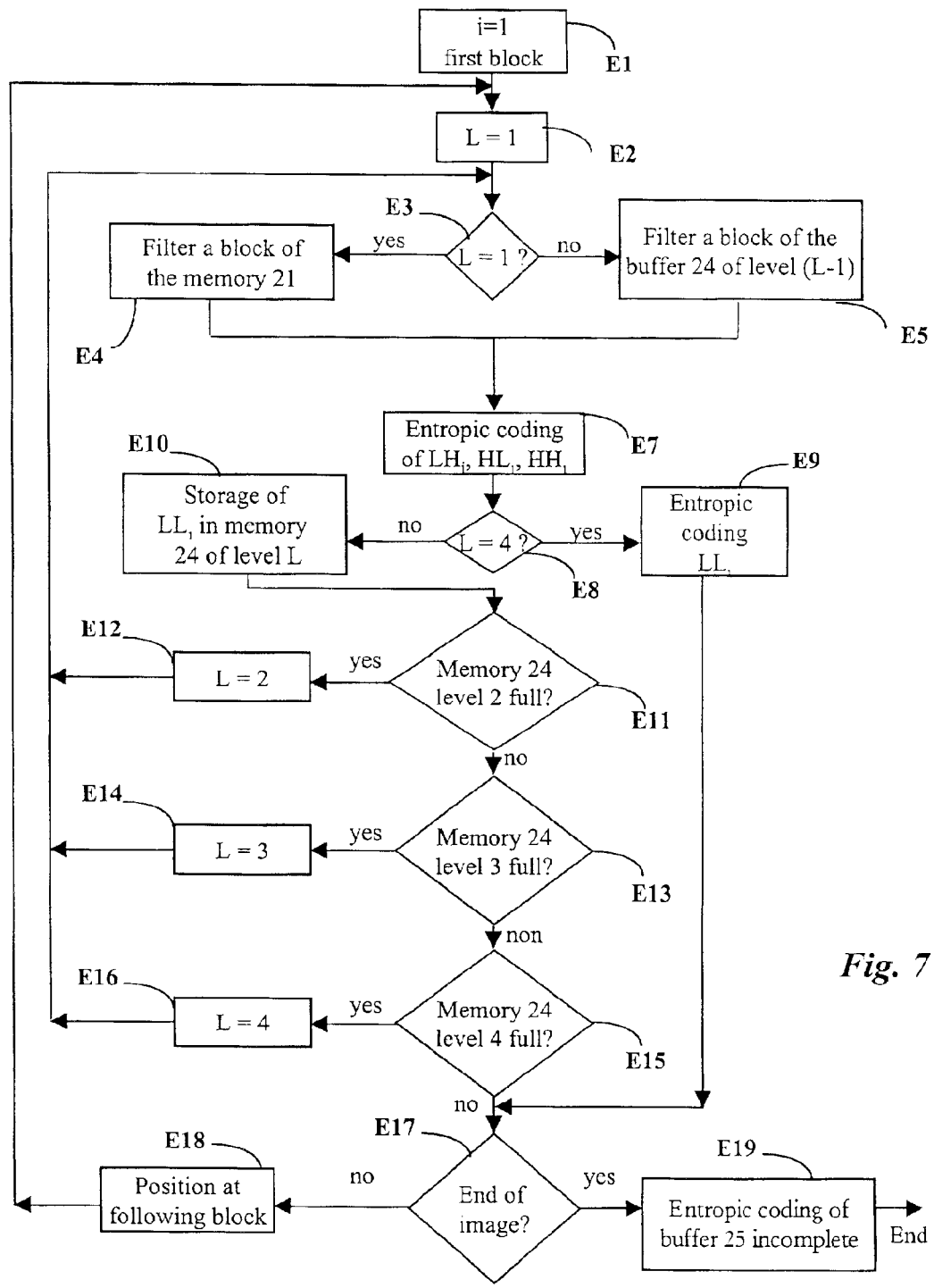
FIG. 7 is a flowchart describing a digital signal transformation method in accordance with the present invention.

Next, a description will be made with reference to FIG. 7. FIG. 7 describes execution steps of software to be run in the configuration shown in FIG. 3.

At step E1, a working parameter i is initialized to 1 in order to designate the first block to be processed. The parameter i indicates the rank of a current block.

At step E2, a working parameter L is initialized to 1 in order to perform decomposition at the first resolution level. The parameter L indicates a current resolution level. At step E3, it is judged whether the current resolution level is the first resolution level. If the judgment is made in the affirmative, control is passed to step E4. The block Bi is then read into a memory (working memory area in the RAM 203 shown in FIG. 3), and subjected to frequency analysis. Four sub-frequency band blocks LLi, LHi, HLi, and HHi resulting from the analysis are stored in a buffer memory (area in the RAM 203 shown in FIG. 3 allocated as a buffer memory).

If the judgment is made in the negative at step E3, control is passed to step E5. At step E5, sub-frequency band blocks LL produced at a lower resolution level and stored in the buffer memory are grouped into a block, and the block is subjected to frequency analysis.

Steps E4 and E5 are succeeded by step E7 at which sub-frequency frequency band blocks LHi, HLi, and HHi each including high-frequency samples are quantized and entropy-coded. These operations are carried out as conventionally and will therefore not be detailed herein.

At step E8, it is judged whether the current resolution level is the highest resolution level. In the embodiment shown in this drawing, the highest resolution level is 4. It is therefore judged whether the parameter L equals to 4.

If the judgment is made in the affirmative, control is passed to step E9. The sub-frequency band block LLi is quantized and entropy-coded in the same manner. This means that the sub-frequency band block LLi need not be stored in the buffer memory.

If the judgment is made in the negative at step E8, control is passed to step E10. At step E10, the sub-frequency band block LLi is stored in a predetermined area in the buffer memory associated with the current resolution level L.

Step E10 is succeeded by step E11. At step E11, it is judged whether a predetermined area in the buffer memory associated with the first resolution level is filled with the sub-frequency band blocks LLi. In other words, it is judged whether the sub-frequency band blocks LLi to be filtered at the second resolution level are grouped into a block of a predetermined size. In this embodiment, the block size is a size of (64(+1) samples by 64(+1) samples).

If the judgment is made in the affirmative, step E11 is succeeded by step E12 at which the parameter L is set to 2.

Step E12 is succeeded by step E3, whereby the sub-frequency band blocks LLi stored in the predetermined area in the buffer memory associated with the first resolution level are filtered.

If the judgment is made in the negative at step E11, control is passed to step E13. At step E13, it is judged whether a predetermined area in the buffer memory associated with the second resolution level is filled with the sub-frequency band blocks LLi. In other words, it is judged whether the sub-frequency band blocks LLi to be filtered at the third resolution level are grouped into a block of a predetermined size.

If the judgment is made in the affirmative, control is passed to step E14 at which the parameter L is set to 3. Step E14 is succeeded by step E3, whereby the sub-frequency band blocks LLi stored in the area in the buffer memory associated with the second resolution level are filtered.

If the judgment is made in the negative at step E13, control is passed to step E15. At step E15, it is judged whether a predetermined area in the buffer memory associated with the third resolution level is filled with the sub-frequency band blocks LLi. In other words, it is judged whether the sub-frequency band blocks LLi to be filtered at the fourth resolution level are grouped into a block of a predetermined size.

If the judgment is made in the affirmative, control is passed to step E16 at which the parameter L is set to 4. Step E16 is succeeded by step E3, whereby the sub-frequency band blocks LLi stored in the area in the buffer memory associated with the second resolution level are filtered.

The number of steps, for example, steps E11 to E16 depends on the number of resolution levels.

If the judgment is made in the negative at step E15, step E15 is succeeded by step E17 at which it is judged whether the whole of an image to be coded has been processed.

If the judgment is made in the negative, control is passed to step E18 at which the working parameter i is incremented by one in order to input the next block in the image. As mentioned above, blocks are processed in predetermined order. Step E18 is succeeded by step E2.

If the judgement is made in the affirmative at step E17, step E17 is succeeded by step E19 at which the whole buffer memory is vacated and stored data is quantized and coded. Image coding is thus terminated.

The present invention is not limited to the aforesaid embodiment, but includes other different forms to be realized by those skilled in the art. Specifically, a block-based discrete wavelet transformation device and method in accordance with the present invention may be installed as part of a scanner, a copier, or a digital camera, or may be realized in the form of a program.

What is claimed is:

1. A method of performing discrete wavelet transformation on an image signal, comprising:
   a first step, of dividing the image into a plurality of first blocks each consisting of (W pixels by H pixels);
   a second step, of performing a one-level forward wavelet transformation on each of the first blocks to produce sub-frequency band blocks LL, LH, HL, and HH;
   a third step, of storing sub-frequency band blocks LL so as to produce second blocks having the same size as the first blocks and each consisting of sub-frequency band blocks LL obtained in said second step from four of the first blocks; and
   a fourth step, of performing a one-level forward wavelet transformation on the second blocks.

2. A method according to claim 1, wherein the image is divided into a plurality of first groups each consisting of (n first blocks horizontally lined in the image by n first blocks vertically lined therein), and said second to fourth steps are performed on each first group.

3. A method according to claim 1, wherein: sub-frequency band blocks LL resulting from said fourth step are stored in units of the first group in order to produce third blocks having the same size as the first blocks; the third blocks are used as the first blocks and subjected to a one-level forward wavelet transformation; the image is divided into a plurality of second groups each consisting of (n first groups horizontally lined in the image by n first groups vertically lined therein); and production of the third blocks and wavelet transformation thereof are performed in units of the second group.

4. A method according to claim 3, wherein grouping to be performed according to a required resolution level meets the condition that each of groups to be produced at an i resolution level should consist of (n groups produced at an (i-1) resolution level to be horizontally lined in the image by n groups produced thereat to be vertically lined therein).

5. A method according to claim 4, wherein, within a group of a resolution level i, the groups produced at resolution level (i-1) are processed according to a zigzag scanning order.

6. A method according to claim 4, wherein at the i resolution level, sub-frequency band blocks LL produced at the (i-1) resolution level are grouped in order to produce blocks having the same size as the first blocks, and the blocks are subjected to wavelet transformation.

7. A method according to claim 1, wherein the size of the first blocks is [W+OW]*[H+OH], where OW denotes the number of columns and OH the number of rows shared by overlapping adjacent blocks.

8. A method according to claim 2, wherein n denotes 2.

9. A storage device storing computer-usable instructions for causing a programmable processing apparatus to become operable to perform a method according to any of claims 1 to 8 and 5.

10. A storage product storing computer-usable instructions for causing a programmable processing apparatus to become operable to perform a method according to any of claims 1 to 8 and 5.

11. A signal conveying computer-usable instructions for causing a programmable processing apparatus to become operable to perform a method according to any of claims 1 to 8 and 5.

12. A scanner implementing a method according to any claims 1 to 7 and 5.

13. A copier machine implementing a method according to any claims 1 to 7 and 5.

14. A digital camera implementing a method according to any claims 1 to 7 and 5.

15. A coding method including a method according to any claims 1 to 8 and 5.

16. A coding apparatus including device according to claim 14.

17. A device for performing block-based discrete wavelet transformation on an image signal, comprising:
   a controller for dividing the image into a plurality of first blocks each consisting of (W pixels by H pixels);
   a filtering circuit for performing a one-level forward wavelet transformation on each of the first blocks to produce sub-frequency band blocks LL, LH, HL, and HH; and
   a memory circuit in which sub-frequency band blocks LL are stored in order to produce second blocks having the same size as the first blocks and each consisting of sub-frequency band blocks LL obtained in said filtering circuit from four of the first blocks,
   wherein said filtering circuit performs a one-level forward wavelet transformation on the second blocks.

18. A device according to claim 17, comprising a number of memory circuits of the same size as the first blocks equal to the number of required resolution levels, each of the memory circuits being adapted to store sub-frequency band coefficients LL.

* * * * *

UNITED STATES PATENT AND TRADEMARK OFFICE
CERTIFICATE OF CORRECTION

PATENT NO. : 6,944,349 B1  Page 1 of 1
APPLICATION NO. : 09/550319
DATED : September 13, 2005
INVENTOR(S) : Patrice Onno et al.

It is certified that error appears in the above-identified patent and that said Letters Patent is hereby corrected as shown below:

ON THE TITLE PAGE [75]:

Inventors, "Patrice Onno, Maginot (FR);" should read --Patrice Onno, Rennes (FR);--.

COLUMN 10:

Line 24, "claims 1" should read --claims 1 to 8.--;
Line 25, "to 8 and 5." should be deleted;
Line 29, "claims 1 to 8 and 5." should read --claims 1 to 8.--;
Line 32, "claims 1" should read --claims 1 to 8.--;
Line 33, "to 8 and 5." should be deleted;
Line 35, "claims 1 to 7 and 5." should read --of claims 1 to 7.--;
Line 37, "claims 1 to 7 and 5." should read --of claims 1 to 7.--;
Line 39, "claims 1 to 7 and 5." should read --of claims 1 to 7.--;
Line 41, "claims 1 to 8 and 5." should read --of claims 1 to 8.--; and
Line 42, "device" should read --a device--.

Signed and Sealed this

Twenty-sixth Day of September, 2006

JON W. DUDAS
*Director of the United States Patent and Trademark Office*